United States Patent
Wentzek et al.

[19]

[11] Patent Number: 6,079,257
[45] Date of Patent: Jun. 27, 2000

[54] DIGITAL CONTROL FOR DYNAMOMETER

[75] Inventors: Horst F. Wentzek, Kenosha; James W. Grygera, Racine, both of Wis.

[73] Assignee: Frank L. Wells Company, Kenosha, Wis.

[21] Appl. No.: 08/905,634

[22] Filed: Aug. 4, 1997

[51] Int. Cl.[7] ............................. G01L 3/22; G01M 17/00
[52] U.S. Cl. .................................................... 73/117
[58] Field of Search ................................. 73/117, 117.2, 73/117.3, 118.1, 862, 862.08, 862.18, 862.332, 862.17

[56] References Cited

U.S. PATENT DOCUMENTS

| | | | |
|---|---|---|---|
| 3,704,624 | 12/1972 | Marten et al. | 73/117 |
| 4,161,116 | 7/1979 | Fegraus et al. | 73/117 |
| 4,530,248 | 7/1985 | Munson | 73/862.17 |
| 5,635,651 | 6/1997 | Tascillo et al. | 73/862.18 |

*Primary Examiner*—George Dombroske
*Attorney, Agent, or Firm*—Michael Best & Friedrich LLP

[57] ABSTRACT

Disclosed herein is a dynamometer control for a dynamometer including a control field coil and an air gap, which dynamometer control includes a main current line connected to the control field coil and including an electronic switch, means for generating a crossing signal incident to a sinusoidal crossing associated with current flow in the main line, and a micro-processor connected to the crossing signal generating means and to the electronic switch and including a counter which is operable to count between a given count and a zero count at a given counting rate, which includes means for adjusting the given count to provide an adjusted given count, which is operable, when the count is zero, to render the counter inoperable and to output a signal which turns on the electronic switch so as to provide current flow to the control field coil of the dynamometer until the counter is again activated, and which is operable, in response to receipt of the crossing signal, to activate the counter, to load the counter with the adjusted given count, to decrement the counter from the adjusted given count to the zero count at the counting rate, and to turn off the electronic switch so as to halt current flow to the control field coil of the dynamometer until arrival at the zero count, whereby the control field coil is deenergized for a time period determined by the adjusted given count.

21 Claims, 2 Drawing Sheets

9
DIGITAL CONTROL FOR DYNAMOMETER

BACKGROUND OF THE INVENTION

The invention relates generally to controlling eddy current dynamometers. More particularly, the invention is applicable to eddy current dynamometers where there is a lag in the controlled flux density with respect to the applied signal or voltage.

Attention is directed to U.S. Pat. No. 4,530,248 issued Jul. 23, 1985.

SUMMARY OF THE INVENTION

The invention provides a control for a dynamometer including a control field coil and an air gap, the dynamometer control comprising a main current line adapted to be connected to the control field coil of the dynamometer and including an electronic switch having a control gate, means for generating a crossing signal in response to detection of a sinusoidal crossing associated with current flow in the main current line, and a micro-processor connected to the crossing signal generating means, and to the control gate and including a counter which is operable to count between a given count and an other count at a given counting rate, which includes means for adjusting the given count to provide an adjusted given count, which is operable, when the count is the other count, to render the counter inoperable and to output a signal which turns on the electronic switch so as to provide current flow to the control field coil of the dynamometer until the counter is again activated, and which is operable, in response to receipt of the crossing signal, to activate the counter, to load the counter with the adjusted given count, to increment or decrement the counter from the adjusted given count to the other count at the counting rate, and to turn off the electronic switch so as to halt current flow to the control field coil of the dynamometer until arrival at the other count, whereby the control field coil is deenergized for a time period determined by the adjusted given count.

The invention also provides a control for a dynamometer including a control field winding and an air gap, the dynamometer control comprising a main current line which comprises a rectified AC current line, which is adapted to be connected to the control field coil of the dynamometer, and which includes an SCR having a control gate, means for generating a crossing signal in response to detection of a sinusoidal crossing associated with current flow in the main current line, a micro-processor connected to the crossing signal generating means, and to the control gate and including a counter which is operable to count between a given count and an other count at a given counting rate, which includes means for adjusting the given count to provide an adjusted given count, and a memory associating a particular adjusted given count with a particular flux density, which is operable, when the count is the other count, to render the counter inoperable and to output a signal which turns on the electronic switch so as to provide current flow to the control field winding of the dynamometer until the counter is again activated, and which is operable, in response to receipt of the crossing signal, to activate the counter, to load the counter with the adjusted given count, to increment or decrement the counter from the adjusted given count to the other count at the counting rate, and to turn off the electronic switch so as to halt current flow to the control field winding of the dynamometer until arrival at the other count, whereby the control field winding is deenergized for a time period determined by the adjusted given count, and a flux density sensor located adjacent the air gap of the dynamometer, connected to the micro-processor, and operative to measure the magnetic flux density of the dynamometer air gap to provide indication of the actual torque.

The invention also provides a control for a dynamometer including a control field winding and an air gap, the dynamometer control comprising a main current line which comprises a rectified AC current line, which is adapted to be connected to the control field winding of the dynamometer, and which includes an SCR having a control gate, means for generating a crossing signal in response to detection of a sinusoidal crossing associated with current flow in the main current line, a micro-processor connected to the crossing signal generating means, and to the control gate and including a counter which is operable to count between a given count and an other count at a given counting rate, which includes means for adjusting the given count to provide an adjusted given count, and a memory associating a particular adjusted given count with a particular flux density, which is operable, when the count is the other count, to render the counter inoperable and to output a signal which turns on the electronic switch so as to provide current flow to the control field winding of the dynamometer until the counter is again activated, and which is operable, in response to receipt of the crossing signal, to activate the counter, to load the counter with the adjusted given count, to increment or decrement the counter from the adjusted given count to the other count at the counting rate, and to turn off the electronic switch so as to halt current flow to the control field winding of the dynamometer until arrival at the zero count, whereby the control field winding is deenergized for a time period determined by the adjusted given count, and a current flow sensor connected to the micro-processor, connected in circuit with the control field winding of the dynamometer, and operative to measure the current flow in the control field winding of the dynamometer to provide indication of the actual torque.

Other features and advantages of the invention will become apparent to those skilled in the art upon review of the following detailed description, claims and drawings.

Figure 1:
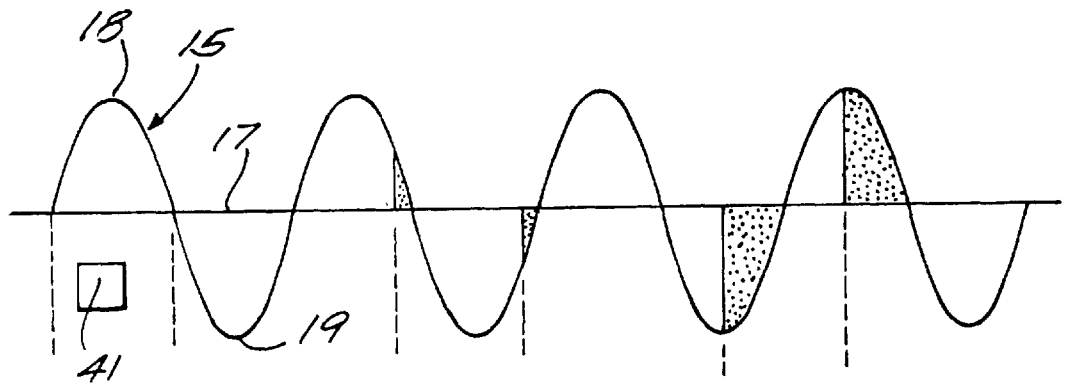
FIG. 1 illustrates a sinusoidal current flow.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
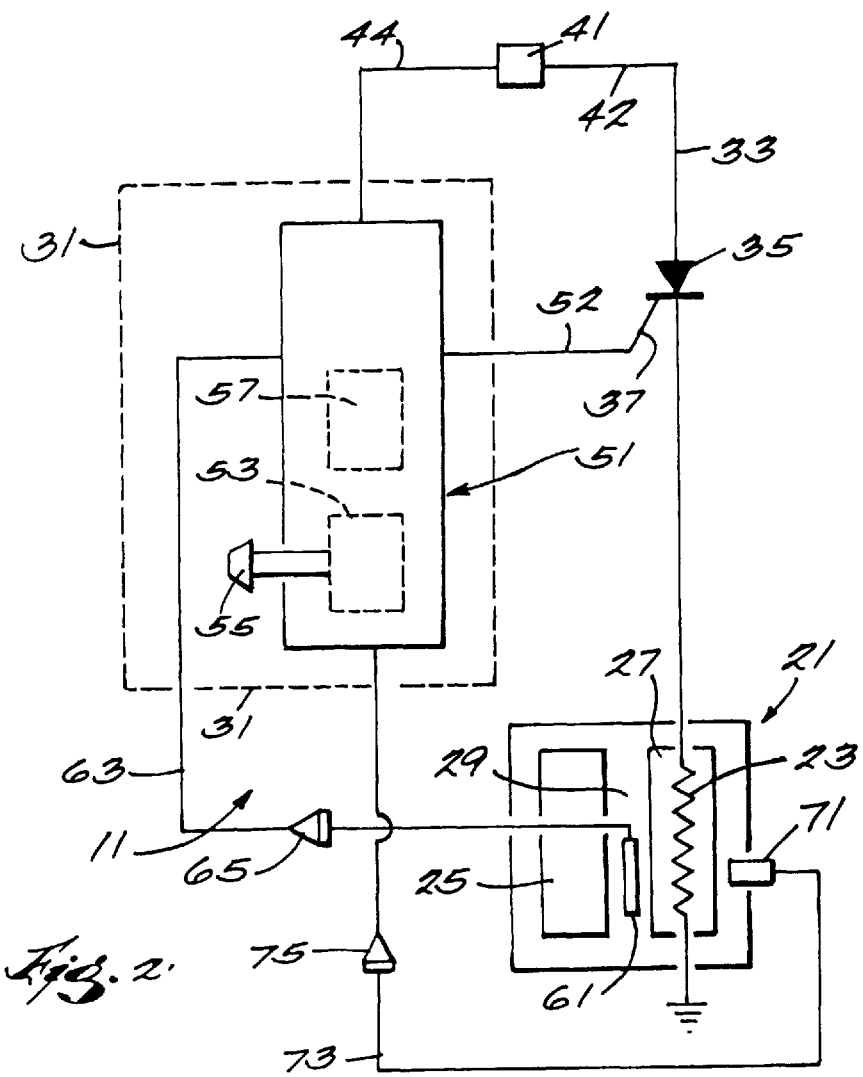
FIG. 2 is a diagrammatic illustration of first embodiment of a digital dynamometer control which embodies various of the features of the invention.

FIG. 2 is illustrative of a first embodiment of a dynamometer control 11 which is digitally operated and which is associated with a sinusoidal current flow which is represented by the line 15 shown in FIG. 1, and which over a given period of time, periodically crosses a zero voltage line 17 between two voltage peaks 18 and 19.

The digital dynamometer control 11 illustrated in FIG. 2 employs this phenomenon to effect control of a regulated or governed dynamometer 21 (shown schematically) where there is a lag in the controlled flux density with respect to the applied signal or voltage. More specifically, the controlled dynamometer 21 includes, as is conventional, a control field coil or winding 23, a rotating mass 25, a stationary mass 27, and an air gap 29 between the rotating mass 25 and the stationary mass 27. One such dynamometer is disclosed in U.S. Pat. No. 4,530,248, which is incorporated herein by reference.

The digital dynamometer control 11 is principally included in a housing 31 (shown diagrammatically) and includes a main current line 33 which is adapted to be connected to the control field coil 23 of the dynamometer 21 and which includes an electronic switch 35 having a control gate 37. Any suitable electronic switch can be employed. In the disclosed construction, the electronic switch is either a transistor or an SCR.

The digital dynamometer control 11 also includes means for generating a crossing signal in response to detection of a sinusoidal crossing associated with current flow in the main current line 33 crossing the zero voltage line 17. Any suitable crossing signal generating means can be employed. In the disclosed construction, such crossing signal generating means comprises a line zero crossing sensor 41 which is located exteriorly of the housing 31, which is connected by a lead 42 to the main line 33 upstream of the electronic switch 35, and which is also connected by a lead 44 to a micro-processor which is disclosed beginning in the next paragraph.

The digital dynamometer control 11 also includes a micro-processor 51 connected to the crossing signal sensor 41 by the lead 44 and is connected to the control gate 37 of the electronic switch 35 by a lead 52. Any suitable microprocessor construction can be employed.

The micro-processor 51 includes a timer or counter 53 which can be preloaded with a digital number representing a certain time period, which is operable to count between the preloaded digital number (a given count) and a zero count at a given counting rate, and which includes means in the form of an adjusting member 55 for adjusting the preloaded digital number or given count to provide an adjusted given count. In addition, the micro-processor 51 is operable, when the count is zero, to render the counter 53 inoperable and to output a signal which turns on the electronic switch 35 so as to provide current flow to the control field coil of the dynamometer until the counter is again activated. Any suitable counter construction can be employed and the counter can be of the count-up type or of the count-down type.

Still further in addition, the micro-processor 51 is operable, in response to receipt of the crossing signal, to activate the counter 53, to load the counter 53 with the adjusted given count, to decrement the counter 53 from the adjusted given count to the zero count at the counting rate, and to turn off the electronic switch 35 so as to halt current flow to the control field coil 23 of the dynamometer 21 until arrival at the zero count, whereby the control field coil 23 is deenergized for a time period determined by the adjusted given count.

Preferably, the micro-processor 51 also includes a memory or "look-up table" 57 associating a particular adjusted given count with a particular magnetic flux density, whereby adjustment of the given count will produce a given flux density in the air gap 29 and thus produce a given torque. Any suitable memory construction can be employed.

The digital dynamometer control 11 also includes a flux density sensor 61 which measures the magnetic flux density of the dynamometer air gap 29 to afford indication of the actual torque, which can be of any suitable construction, and which is connected to the micro-processor 51 by a line 63 which preferably includes a converter 65 which is operable to convert the sensed measurement to digital form. More specifically, the magnetic flux density of the dynamometer air gap 29 is measured to compute the dynamometer torque according to a classical motor equation relating the flux density, the rotational speed, number of poles, and certain constants peculiar to the dynamometer design and its metallurgy. Measurement of the magnetic flux density involves the sending of voltage per kilogauss signal along line 63 to the micro-processor 51 for comparison with the memory value at the adjusted value.

Because current flow in the field coil winding 23 is sensitive to temperature, i.e., the current flow will decrease with increasing temperature and will increase with decreasing temperature, the memory 57 can include an alternate "look-up table" which supplies a correction factor to the desired current flow so as to compensate for the sensitivity of the current flow to temperature. In this regard, the digital dynamometer control 11 also preferably includes a temperature sensor 71 which can be of any suitable construction, which is located in close proximity to the field winding 23, and which is connected to the micro-processor 51 by a line 73 which preferably includes a converter 75 which is operable to convert the sensed measurement to digital form. Any suitable converter can be employed.

Suitable indicators (not specifically shown) can be provided on the housing 31 to inform the operator of the dynamometer torque, i.e., the magnetic flux density in the air gap 29, the current flow and/or voltage in the main line 33, and the count of the counter 53.

In operation, the counter 53 is adjusted by the member 55 to provide a given count which, according the applicable memory just referred to, corresponds to a given torque loading. The micro-processor 51 then operates to control the current flow in the main line 33 so as to obtain the desired magnetic flux in the air gap 29. More specifically, in operation, the control utilizes the fact that a specific counter (load) number produces a specific field current, that field flux density is proportional to the field current, that torque is determined by field flux density, and that field flux density is measured to determine torque. In this regard, when the torque (arrived at by measuring the field flux density) is not equal to the desired reference (torque) value, the counter load value is adjusted to cause the flux value to increase or decrease by an amount in excess of the required amount to cause equilibrium. How much correction is based on algorithms which are derived from empirical data specific to the machine and controller. This serves two purposes. First, the apparent overshoot or undershoot which will occur, if the process were allowed to continue, will speed up the correction process by forcing the field current to the new value, particularly if the overdrive is grossly excessive. Secondly, the impending overdrive will cause the flux density to approach the desired value, and then to go on to exceed it.

The flux density is measured, and the torque computed at regular intervals, of perhaps 50-milliseconds or 20 times each second. As the flux density, and the desired torque values change to the new levels, a reading will occur where the torque value, and necessarily the flux value, are equal to, or nearly equal to the desired values. At that time, the flux density value is retrieved and used as the address in memory where the counter load number for that corresponding flux density value is extracted from the "look-up table", and used to load the counter with a new value which will cause the field control voltage to change to the predetermined value which will maintain the field current and flux density at their present, near perfect levels. Subsequent data samples producing small differential error instruct the processor to make corrections of only a few counts to the counter where a small overshoot and/or undershoot of the control voltage is allowed, producing a control noise band, as the long electrical time constant of the field coil will prevent the field current, and necessarily the flux density, from changing instantaneously.

The result is rapid correction to the desired steady-state level with little or no overshoot or undershoot, effectively using the electrical time constant of the machine and the "look-up table" relating the flux density and a predetermined control voltage to reduce the control system to a virtual single order system, which is inherently stable and insensitive to loop gain. Algorithms using differential magnitude and rate-of-closure may be used with this method to approximate critically damped analog correction.

The "look-up table" is generated by the micro-processor itself, at the time of initial machine calibration, by executing a "learn" program where it adjusts the counter load values to obtain the desired successive incremental flux density or field current. This data is then written into non-volatile memory, where the data remains intact through out the life of the equipment.

Figure 3:
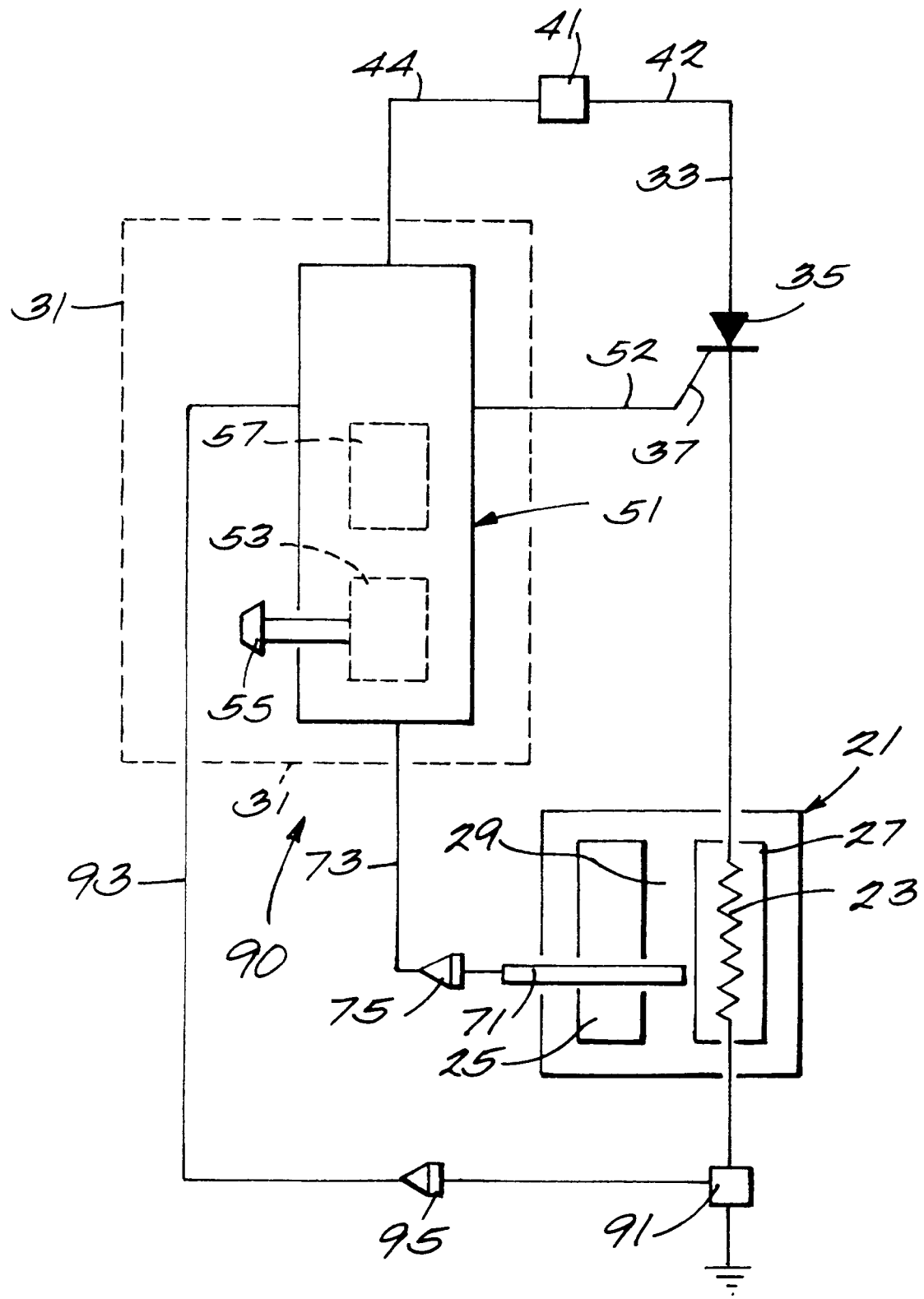
FIG. 3 is a diagrammatic illustration of a second embodiment of a digital dynamometer control which embodies various of the features of the invention.

Shown in FIG. 3 is another embodiment of a digital dynamometer control 90 which is generally identical to the embodiment shown in FIG. 2 except that the second embodiment omits the flux density sensor 61 and, instead, includes a sensor 91 which measures the current flow in the field winding 23 to afford indication of the actual torque and which supplies such information to the digital control. More specifically, the current flow sensor 91 can be of any suitable construction, is located in close proximity to the field winding 23, and is connected to the micro-processor 51 by a line 93 which preferably includes a converter 95 which is operable to convert the sensed measurement to digital form. Any suitable converter can be employed.

Still more specifically, the current in the field winding 23 is measured by the sensor 91 to compute the dynamometer torque according to a classical motor equation relating the current flow in the field winding, the rotational speed, the number of poles, and certain constants peculiar to the dynamometer design and its metallurgy. Measurement of the current flow in the field winding 23 involves the sending of a current flow signal along line 93 to the micro-processor 51 for comparison with the memory value at the adjusted value.

In operation, the second embodiment operates in the same general manner as the first embodiment, except that a current flow signal generated by the current flow sensor 91 is employed, rather than a flux density signal generated by the flux density sensor 61.

Various of the features of the invention are set forth in the following claims.

What is claimed is:

1. A control for a dynamometer including a control field coil and an air gap, said dynamometer control comprising a main current line adapted to be connected to the control field coil of the dynamometer and including an electronic switch having a control gate, means for generating a crossing signal in response to detection of a sinusoidal crossing associated with current flow in said main current line, and a micro-processor connected to said crossing signal generating means, and to said control gate and including a counter which is operable to count between a given count and an other count at a given counting rate, which includes means for adjusting said given count to provide an adjusted given count, which is operable, when said adjusted given count substantially equals said other count, to render said counter inoperable and to output a signal which turns on said electronic switch so as to provide current flow to the control field coil of the dynamometer until said counter is again activated, and which is operable, in response to receipt of said crossing signal, to activate said counter, to load said counter with said adjusted given count, to increment or decrement said counter from said adjusted given count to said other count at said counting rate, and to turn off said electronic switch so as to halt current flow to the control field coil of the dynamometer until arrival at said other count, whereby the control field coil is deenergized for a time period determined by said adjusted given count.

2. A dynamometer control in accordance with claim 1 wherein said electronic switch is a transistor or an SCR.

3. A dynamometer control in accordance with claim 1 wherein said electronic switch is an SCR.

4. A dynamometer control in accordance with claim 1 wherein said counter also includes a memory associating a particular adjusted given count with a particular flux density.

5. A dynamometer control in accordance with claim 1 and further comprising a flux density sensor which is located adjacent the air gap, which is connected to the micro-processor, and which measures the magnetic flux density of the dynamometer air gap to afford indication of the actual torque.

6. A dynamometer control in accordance with claim 1 and further comprising a current flow sensor which is connected in circuit with the field winding, which is connected to the micro-processor, and which measures the current flow in the field winding to afford indication of the actual torque.

7. A dynamometer control in accordance with claim 1 wherein said main current line comprises a DC current line.

8. A dynamometer control in accordance with claim 1 wherein said main current line comprises a rectified AC current line.

9. A control for a dynamometer including a control field winding and an air gap, said dynamometer control comprising a main current line which comprises a rectified AC current line, which is adapted to be connected to the control field coil of the dynamometer, which including an SCR having a control gate, means for generating a crossing signal in response to detection of a sinusoidal crossing associated with current flow in said main current line, a micro-processor connected to said crossing signal generating means, and to said control gate and including a counter which is operable to count between a given count and an other count at a given counting rate, which includes means for adjusting said given count to provide an adjusted given count, and a memory associating a particular adjusted given count with a particular flux density, which is operable, when said adjusted given count substantially equals said other count, to render said counter inoperable and to output a signal which turns on said electronic switch so as to provide current flow to the control field winding of the dynamometer until said counter is again activated, and which is operable, in response to receipt of said crossing signal, to activate said counter, to load said counter with said adjusted given count, to increment or decrement said counter from said adjusted given count to said other count at said counting rate, and to turn off said electronic switch so as to halt current flow to the control field coil of the dynamometer until arrival at said other count, whereby the control field coil is deenergized for a time period determined by said adjusted given count, and a flux density sensor located adjacent the air gap of the dynamometer, connected to said micro-processor, and operative to measure the magnetic flux density of the dynamometer air gap to provide indication of the actual torque.

10. A control for a dynamometer including a control field winding and an air gap, said dynamometer control comprising a main current line which comprises a rectified AC current line, which is adapted to be connected to the control field winding of the dynamometer, and which includes an SCR having a control gate, means for generating a crossing signal in response to detection of a sinusoidal crossing associated with current flow in said main current line, a micro-processor connected to said crossing signal generating means, and to said control gate and including a counter which is operable to count between a given count and an other count at a given counting rate, which includes means for adjusting said given count to provide an adjusted given count, and a memory associating a particular adjusted given count with a particular flux density, which is operable, when said adjusted given count substantially equals said other count, to render said counter inoperable and to output a signal which turns on said electronic switch so as to provide current flow to the control field winding of the dynamometer until said counter is again activated, and which is operable, in response to receipt of said crossing signal, to activate said counter, to load said counter with said adjusted given count, to increment or decrement said counter from said adjusted given count to said other count at said counting rate, and to turn off said electronic switch so as to halt current flow to the control field winding of the dynamometer until arrival at said zero count, whereby the control field winding is deenergized for a time period determined by said adjusted given count, and a current flow sensor connected to said micro-processor, connected in circuit with the control field winding of the dynamometer, and operative to measure the current flow in the control field winding of the dynamometer to provide indication of the actual torque.

11. A control for a dynamometer including a control field coil and an air gap, said control comprising:
  a main current line connected to the control field coil of the dynamometer and including an electronic switch;
  a crossing signal generator operable to generate a crossing signal;
  a micro-processor operably connected with said crossing signal generator and to said electronic switch and including
    a counter operable to count between a given count and a baseline count, and
    an adjusting member for adjusting said given count to provide an adjusted given count,
      wherein said micro-processor is operable, when said adjusted given count substantially equals said baseline count, to render said counter inoperable and to generate an output signal which turns on said electronic switch so as to provide current flow to the control field coil of the dynamometer, and
      wherein said micro-processor is operable, in response to receipt of said crossing signal, to activate said counter, to load said counter with said adjusted given count, to adjust said adjusted given count to said baseline count, and to turn off said electronic switch so as to halt current flow to the control field coil of the dynamometer until said adjusted given count approximates said baseline count.

12. A dynamometer control in accordance with claim 11 wherein said electronic switch is a transistor or an SCR.

13. A dynamometer control in accordance with claim 11 wherein said electronic switch is an SCR.

14. A dynamometer control in accordance with claim 11 wherein said counter also includes a memory associating a particular adjusted given count with a particular flux density.

15. A dynamometer control in accordance with claim 11 and further comprising a flux density sensor which is located adjacent the air gap, which is connected to the micro-processor, and which measures the magnetic flux density of the dynamometer air gap to afford indication of the actual torque.

16. A dynamometer control in accordance with claim 11 and further comprising a current flow sensor which is connected in circuit with the field winding, which is connected to the micro-processor, and which measures the current flow in the field winding to afford indication of the actual torque.

17. A dynamometer control in accordance with claim 11 wherein said main current line comprises a DC current line.

18. A dynamometer control in accordance with claim 11 wherein said main current line comprises a rectified AC current line.

19. A dynamometer control in accordance with claim 11 wherein said crossing signal is generated in response to detection of a sinusoidal crossing associated with current flow in said main current line.

20. A dynamometer control in accordance with claim 11 wherein said counter is operable to count at a given counting rate.

21. A dynamometer control in accordance with claim 11 wherein upon turning off said electronic switch, the control field coil is deenergized for a time period determined by said adjusted given count.

* * * * *